(12) United States Patent
Huang et al.

(10) Patent No.: US 8,788,800 B2
(45) Date of Patent: Jul. 22, 2014

(54) OS PROCESSING METHOD, SYSTEM AND NON-TRANSITORY COMPUTER READABLE STORAGE MEDIUM THEREOF

(75) Inventors: Yen-Wen Huang, New Taipei (TW); Chung-Ting Kao, Taipei (TW); Hui-Kuang Chung, Taipei (TW); Han-Chao Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 371 days.

(21) Appl. No.: 13/323,860

(22) Filed: Dec. 13, 2011

(65) Prior Publication Data

US 2013/0124841 A1    May 16, 2013

(30) Foreign Application Priority Data

Nov. 10, 2011 (TW) .............................. 100141070 A

(51) Int. Cl.
*G06F 9/00* (2006.01)
*G06F 15/177* (2006.01)
*G06F 9/445* (2006.01)

(52) U.S. Cl.
CPC ...................................... *G06F 9/445* (2013.01)
USPC ........................................................... 713/2

(58) Field of Classification Search
USPC ........................................................... 713/2
See application file for complete search history.

(56) References Cited

U.S. PATENT DOCUMENTS

| | | | |
|---|---|---|---|
| 7,418,588 B2 * | 8/2008 | Lin et al. ........................... 713/2 |
| 7,644,263 B2 * | 1/2010 | Fujii et al. ........................ 713/1 |
| 8,037,291 B2 * | 10/2011 | Peacock ............................ 713/2 |
| 8,239,662 B1 * | 8/2012 | Nelson .............................. 713/1 |
| 8,607,085 B2 * | 12/2013 | Resnick et al. ................. 713/323 |
| 2004/0153840 A1 * | 8/2004 | Buchanan et al. .............. 714/42 |
| 2006/0005034 A1 | 1/2006 | Willman et al. |
| 2007/0073978 A1 * | 3/2007 | Lee ................................ 711/141 |
| 2007/0112899 A1 | 5/2007 | Edwards et al. |
| 2009/0292912 A1 * | 11/2009 | Kim et al. ......................... 713/2 |
| 2010/0241815 A1 * | 9/2010 | McManis ....................... 711/154 |
| 2011/0202794 A1 * | 8/2011 | Kim ................................ 714/15 |
| 2012/0117367 A1 * | 5/2012 | Lu et al. ........................... 713/2 |
| 2012/0216284 A1 * | 8/2012 | Dhamankar et al. ........... 726/24 |

* cited by examiner

*Primary Examiner* — Mohammed Rehman
(74) *Attorney, Agent, or Firm* — McClure, Qualey & Rodack, LLP

(57) ABSTRACT

An operating system (OS) processing method for a host computer includes the following steps: when the host computer is booting, a boot loader is read from a boot reading device according to a boot priority order of the host computer. A signature detecting program included in the boot loader is executed to detect data stored in a specified address of a master boot record (MBR) of the host computer. When it is determined that the present version signature of the host computer does not match the preset version signature according to the data stored in the specified address, an OS image is read from the boot reading device, an OS is installed on the host computer according to the OS image. The data stored in the specified address of the MBR is amended according to an image version signature of the installed OS.

16 Claims, 3 Drawing Sheets

OS PROCESSING METHOD, SYSTEM AND NON-TRANSITORY COMPUTER READABLE STORAGE MEDIUM THEREOF

RELATED APPLICATIONS

This application claims priority to U.S. application Ser. No. 10/0,141,070, filed Nov. 10, 2011, which is herein incorporated by reference.

BACKGROUND

1. Technical Field

The present invention relates to a OS processing method and system and a computer-readable storage medium with a computer program to execute the method.

2. Description of Related Art

As computer technology developing, many different applications evolve. Computer software and hardware also change a lot, which may affect the efficiency of computers. Most users only have to install or adjust software and hardware of few computers. But for MIS engineers, they have to manage a huge amount of computers and that is a big loading.

Lately, OS can be installed step by step, installed according to an OS image, or installed with instructions assisted. Through such install processes, users have to attend their computer for OS install. It is inconvenient for MIS engineers to install OS of several computers, especially for those placed in different places.

SUMMARY

According to one embodiment of this invention, an operating system (OS) processing method for a host computer is provided to install an OS to the host computer according to a determination result, which is made considering to data stored in a specified address of the MBR of the host computer. The OS processing method includes the following steps:

(a) when the host computer is booting, a boot loader is read from a boot reading device according to a boot priority order of the host computer, wherein the boot loader includes a preset version signature.

(b) a signature detecting program included in the boot loader is executed to detect data stored in a specified address of the MBR of the host computer, wherein the data stored in the specified address corresponds to a present version signature of a present OS of the host computer.

(c) when it is determined that the present version signature of the host computer does not match the preset version signature according to the data stored in the specified address, an OS image is read from the boot reading device of the host computer, an OS is installed on the host computer according to the OS image, and the installed OS is taken as the present OS of the host computer.

(d) the data stored in the specified address of the MBR is amended according to an image version signature of the installed OS for corresponding to the present version signature of the present OS of the host computer.

According to another embodiment of this invention, a computer-readable storage medium storing a computer program for executing the steps of the aforementioned OS processing method is provided. Steps of the method are as disclosed above.

According to another embodiment of this invention, an OS processing system disposed on a host computer is provided to install an OS according to a determination result, which is made considering to data stored in a specified address of the MBR of the host computer. The OS processing system includes a storage unit, a boot reading device and a processing unit. The processing unit is communicated with the storage unit and the boot reading device. The storage unit includes an MBR. The storage unit stores a boot priority order of the host computer. When the host computer is booting, the boot reading device reads a boot loader according to the boot priority order of the host computer. The boot loader includes a preset version signature. The processing unit includes a boot module, a determining module and a signature amending module. The boot module for executing a signature detecting program comprised in the boot loader to detect data stored in a specified address of the MBR of the storage unit. The data stored in the specified address corresponds to a present version signature of a present OS of the host computer. When it is determined that the present version signature of the host computer does not match the preset version signature according to the data stored in the specified address, the determining module reads an OS image from the boot reading device, installs an OS on the host computer according to the OS image, and takes the installed OS as the present OS of the host computer. The signature amending module amends the data stored in the specified address of the MBR according to an image version signature of the installed OS for corresponding to the present version signature of the present OS of the host computer.

The present invention can achieve many advantages. An OS of a host computer can be installed or updated by storing or loading a boot loader and an OS image of the OS desired to be installed in a boot reading device of the host computer. In one preferred embodiment of this invention, the host computer can be set to boot from a remote server through a network. Therefore, the OS of the host computer can be installed or updated by storing the boot loader and the OS image desired to installed on the remote server, which leads that users do not have to attend the place where the host computer installed in person. In one scenario utilizing the present invention, users can install or update OS of several host computers at the same time without attend the host computers in person.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
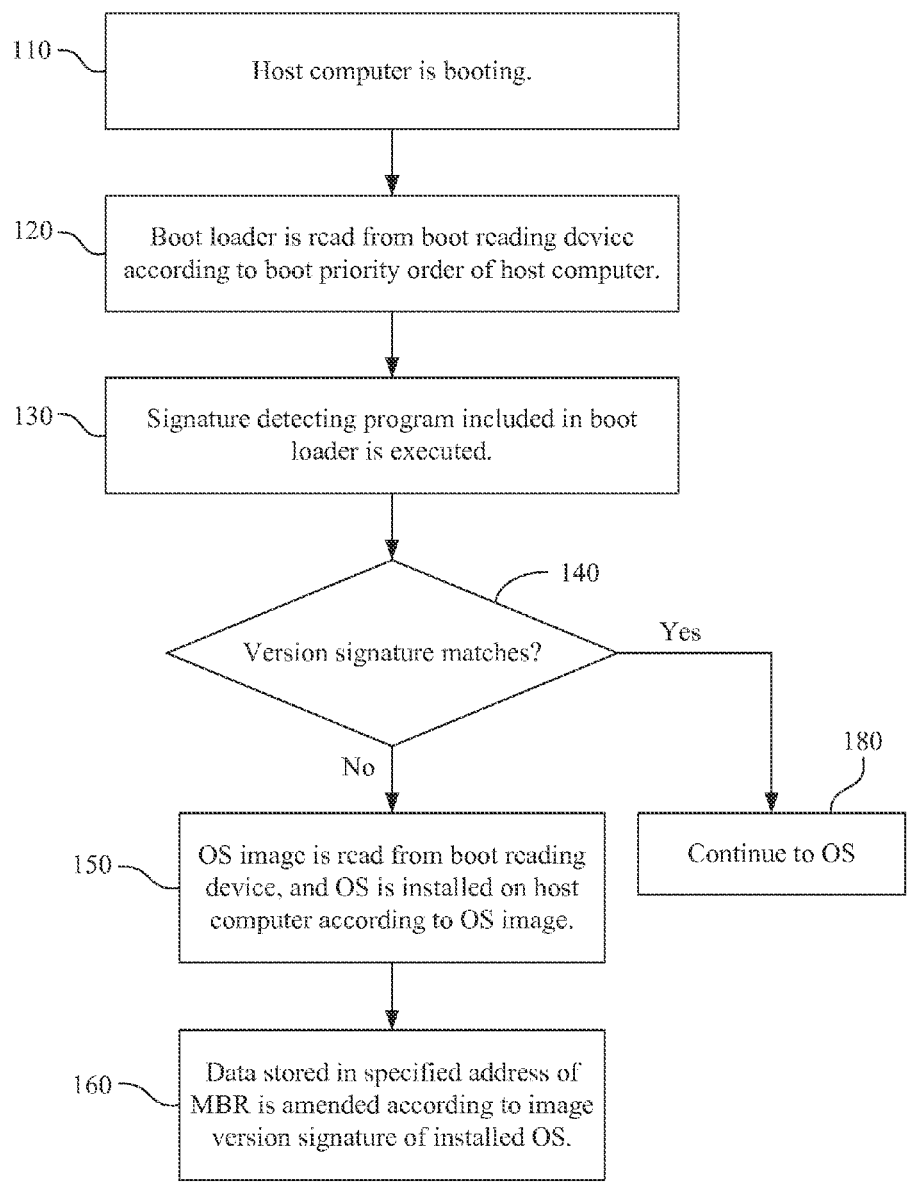
FIG. 1 is a flow diagram of an operating system (OS) processing method for a host computer according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates an operating system (OS) processing method for a host computer according to one embodiment of this invention. In the OS processing method, an OS is installed to the host computer according to a determination result, which is determined according to data stored in a specified address of the MBR of the host computer. The OS processing method may take the form of a computer program product stored on a computer-readable storage medium having computer-readable instructions embodied in the medium. Any suitable storage medium may be used. In some embodiments, such suitable storage medium may be a non-transitory computer readable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. In other embodiments, other suitable storage mediums may be used, which should not be limited in this disclosure.

The operating system (OS) processing method in the FIG. 1 is applied on a host computer with an MBR. The host computer may indicate a physical computer/server or a virtual machine. If the host computer is a virtual machine simulated on a physical computer, there are a boot reading device, a virtual OS and a boot priority order in the virtual machine which is similar to the physical computer.

The routine 100 for the OS processing method may starts at operation 110, where the host computer is booting. When the host computer is booting, the routine 100 continues from operation 110 to operation 120, where a boot loader is read from a boot reading device according to a boot priority order of the host computer. The boot loader includes a preset version signature. The boot priority order of the host computer can be configured through a basic input/output system (BIOS) of the host computer, such that one of different reading devices can be set as the boot reading device. In general, the reading device, which is set as the first sequence in the boot priority order of the host computer, is taken as the boot reading device. For example, a flash memory, a floppy disk drive, a hard disk drive, a optical disk drive, a USB HDD, a magnetic storage device, a remote server accessed through a network or any other reading device can be set as the boot reading device. Subsequently, the boot loader can be stored or loaded into the boot reading device for reading at operation 120. In addition, an OS image desired to be installed can be also stored or loaded into the booting reading device.

The routine 100 continues to operation 130, where a signature detecting program included in the boot loader is executed to detect data stored in a specified address of the MBR of the host computer. The data stored in the specified address of the MBR corresponds to a present version signature of a present OS of the host computer. In subsequence, the routine 100 continues to operation 140, where determine if the present version signature of the host computer matches the preset version signature according to the data stored in the specified address. In one embodiment of this invention, the data stored in the specified address of the MBR may be present version signature of the host computer, and the determination at operation 140 may be made by comparing the data stored in the specified address (present version signature) with the preset version signature. The specified address may be address 444 or 445 of the MBR, which would not be taken as damaged for storing the data in address 444 or 445, and not be overwritten by other information in address 444 or 445. In another embodiment of this invention, the data stored in the specified address represents a storage location on the host computer for storing the present version signature. Hence, at operation 130, the present version signature may further be read from the storage location on the host computer, which the data stored in the specified address represents, for operation 140 to do determination. Therefore, storage locations other than the MBR (for example, specified files, specified location at the OS of the host computer, or specified blocks of a storage unit of the host computer) can be utilized, which can provide a large storage capacity for storing the present version signature.

When it is determined that the present version signature of the host computer match the preset version signature according to the data stored in the specified address, the routine 100 continues to operation 180, where the host computer continues to execute the OS of the host computer.

When it is determined that the present version signature of the host computer does not match the preset version signature according to the data stored in the specified address, the routine 100 continues to operation 150, where an OS image is read from the boot reading device of the host computer, an (new or updated) OS is installed on the host computer according to the OS image to be taken as the present OS of the host computer.

Subsequently, the routine 100 continues to operation 160, where the data stored in the specified address of the MBR is amended according to an image version signature of the (newly or updatedly) installed OS. Hence, the amended data stored in the specified address can correspond to the present version signature of the present OS of the host computer installed at operation 150. In some embodiments, if the data stored in the specified address of the MBR is the present version signature of the OS of the host computer, the image version signature of the installed OS can be written into the specified address of the MBR to be taken as the present version signature. In some embodiments, if the data stored in the specified address of the MBR represents the storage location on the host computer for storing the present version signature, the image version signature of the installed OS can be written into another address and the information of the written address is written into the specified address of the MBR. In some other embodiments, if the data stored in the specified address of the MBR represents the storage location on the host computer for storing the present version signature, the image version signature of the installed OS can be written into the storage location, which the data stored in the specified address of the MBR represents.

In further, after operation 160, the routine 100 may continue to operation to reset the host computer, such that the host computer can execute the (newly or updated) installed OS. Therefore, the OS of the host computer can be installed or updated by storing or loading a boot loader and an OS image of the OS desired to be installed in the boot reading device. In addition, the present invention is suitable for any host computer with or without OS installed. In one preferred embodiment of this invention, the host computer can be set to boot from a remote server through a network. Therefore, the OS of the host computer can be installed or updated by storing the boot loader and the OS image desired to be installed on the remote server, which leads that users do not have to attend the place where the host computer installed in person. In one scenario utilizing the present invention, users can install or update OS of several host computers at the same time without attend the host computers in person.

In one embodiment of this invention, when it is determined that the present version signature of the host computer does not match the preset version signature at operation 140, the image version signature may be further read to determine if the present OS of the host computer needs to be updated. If it is determined that the present OS needed to be updated, the present OS of the host computer is updated according to the OS image, and the data stored in the specified address of the MBR is amended according to the image version signature of the installed OS, such that the data stored in the specified address may correspond to the present version signature of the present OS of the host computer. Therefore, the OS of the host computer can be updated by storing or loading a boot loader and an OS image of the OS desired to be installed in the boot reading device.

In another embodiment of this invention, when it is determined that the present version signature of the host computer does not match the preset version signature at operation 140, further determines if the data stored in the specified address is less than the preset version signature. In this embodiment, the signature corresponding to new version may be set to a larger value. In other words, the signature may be amended to a larger value after updating. Hence, if it is determined that the data stored in the specified address is less than the preset version signature, the OS on the host computer is installed according to the OS image and the data stored in the specified address of the MBR is amended according to the image version signature of the installed OS, such that the amended data stored in the specified address may correspond to the present version signature of the present OS of the host computer after being updated.

In still another embodiment of this invention, the present version signature may be generated with an error-detecting method. Hence, if the data stored in the specified address corresponding to the present version signature of the host computer is correct and it can be determined by the error-detecting method, the determination result of which can be a factor to determine if the present version signature of the host computer matches the preset version signature. In some embodiments, the error-detecting method may be Cyclic Redundancy Check (CRC) or any other error-detecting method. In another embodiment of this invention, signature of available version can be pre-stored for doing the determination thereof. In other embodiments, some other methods can be utilized to do the determination thereof, which should not be limited in this disclosure.

Hence, if it is determined incorrect, the OS on the host computer is installed according to the OS image, which is subsequently taken as the present OS of the host computer. In one embodiment, if the data stored in the specified address is the present version signature of the host computer, the data stored in the specified address may be detected by the error-detecting method. In another embodiment, if the data stored in the specified address of the MBR represents the storage location on the host computer for storing the present version signature, the present version signature may be read from the storage location on the host computer for error detection with the error-detecting method. In subsequence, the data stored in the specified address of the MBR is amended according to the image version signature of the installed OS. Then, the host computer may be reset to execute the newly installed OS. Therefore, if the data stored in the specified address of the MBR is incorrect, the OS of the host computer can be re-installed. In one scenario of the present invention, if the MBR is affected by a boot-type virus, which may damage the MBR of the host computer, the OS of the host computer can be re-installed with the present invention.

Figure 2:
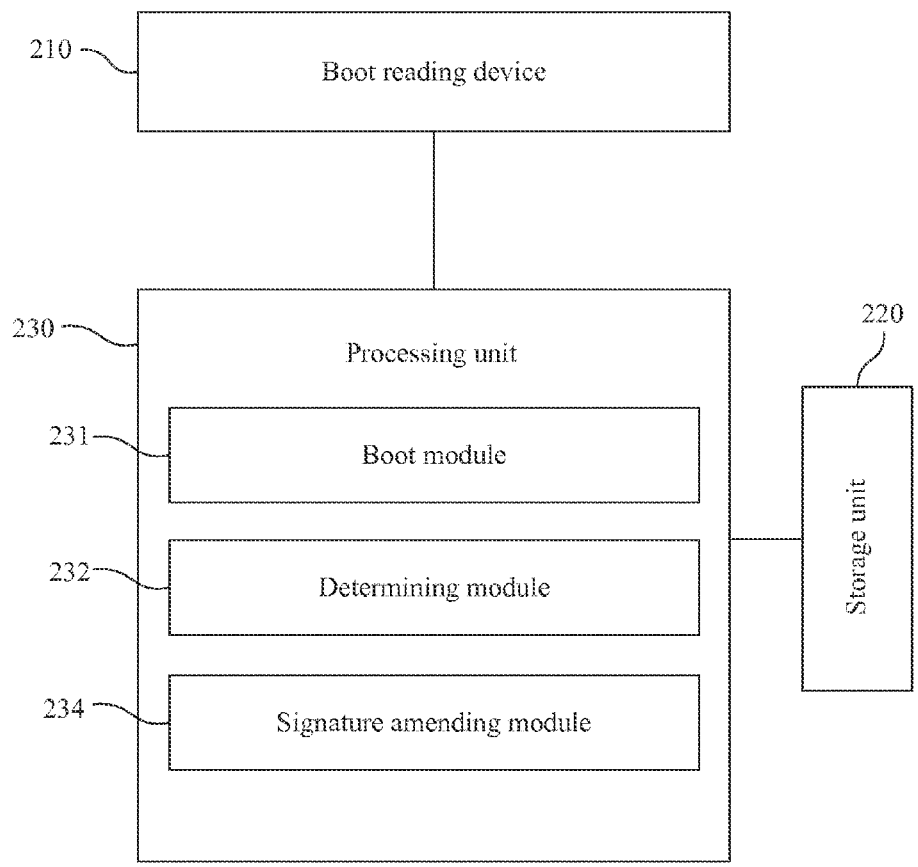
FIG. 2 illustrates a block diagram of an OS processing system according to an embodiment of this invention.

Referring to FIG. 2, a block diagram will be described that illustrates an OS processing system according to an embodiment of this invention. The OS processing system installs an OS according to a determination result, which is made considering to data stored in a specified address of the MBR of a host computer.

The OS processing system 200 is disposed on a host computer. The OS processing system 200 includes a boot reading device 210, a storage unit 220 and a processing unit 230. The processing unit 230 is communicated with the boot reading device 210 and the storage unit 220. In one embodiment of this invention, the processing unit 230 may be electrically connected with the boot reading device 210 and the storage unit 220 for communication. In another embodiment of this invention, the processing unit 230 may be communicated with the boot reading device 210 and the storage unit 220 through a network. In other embodiments, the processing unit 230 may be communicated with the boot reading device 210 and the storage unit 220 through other communication method. The boot reading device 210 and the storage unit 220 may utilize different communication method to communicate with the processing unit 230, which should not be limited in this disclosure.

The storage unit 220 includes an MBR. The storage unit 220 stores a boot priority order of the host computer. When the host computer is booting, the boot reading device 210 reads a boot loader according to the boot priority order of the host computer. The boot loader includes a preset version signature. In some embodiments, the storage unit 220 may be a flash memory, a floppy disk drive, a hard disk drive, a optical disk drive, a USB HDD, a magnetic storage device, a remote server accessed through a network or any other reading device.

The processing unit 230 includes a boot module 231, a determining module 232 and a signature amending module 234. The boot module 231 executes a signature detecting program included in the boot loader to detect data stored in a specified address of the MBR of the storage unit 220. The data stored in the specified address corresponds to a present version signature of a present OS of the host computer. The boot reading device 210 can be set through BIOS of the host computer for reading data in the first place after boot. Hence, the boot loader can be loaded or stored in the boot reading device 210 for being read after the host computer is booting. In addition, an OS image of an OS desired to be installed can be further stored or loaded in the boot reading device 210.

The determining module 232 determines if the present version signature of the host computer matches the preset version signature according to the data stored in the specified address of the MBR of the storage unit 220. When the determining module 232 determines that not match, the OS image is read from the boot reading device 210, and an (new or updated) OS is installed on the host computer according to the OS image, such that the (newly or updatedly) installed OS is taken as the present OS of the host computer. The signature amending module 234 amends the data stored in the specified address of the MBR of the storage unit 220 according to an image version signature of the installed OS, such that the amended data corresponds to the present version signature of the present OS of the host computer. In some embodiments, if the data stored in the specified address of the MBR is the present version signature of the OS of the host computer, the signature amending module 234 may write the image version signature of the installed OS into the specified address of the MBR, which is then taken as the present version signature. In some embodiments, if the data stored in the specified address of the MBR represents the storage location on the host computer for storing the present version signature, the signature amending module 234 may write the image version signature of the installed OS into another address of the storage unit 220 and write the information of the written address into the specified address of the MBR. In some other embodiments, if the data stored in the specified address of the MBR represents the storage location on the host computer for storing the present version signature, the signature amending module 234 may write the image version signature of the installed OS into the storage location, which the data stored in the specified address of the MBR represents.

In subsequence, the processing unit 230 may reset the host computer, such that the host computer can execute the newly installed OS. Therefore, the OS of the host computer can be installed or updated by storing or loading a boot loader and an OS image of the OS desired to be installed in the boot reading device 210. In one preferred embodiment of this invention, a remote server can be set as the boot reading device 210. Therefore, the OS of the host computer can be installed or updated by storing the boot loader and the OS image desired to installed on the remote server, which leads that users do not have to attend the place where the host computer installed in person.

Figure 3:
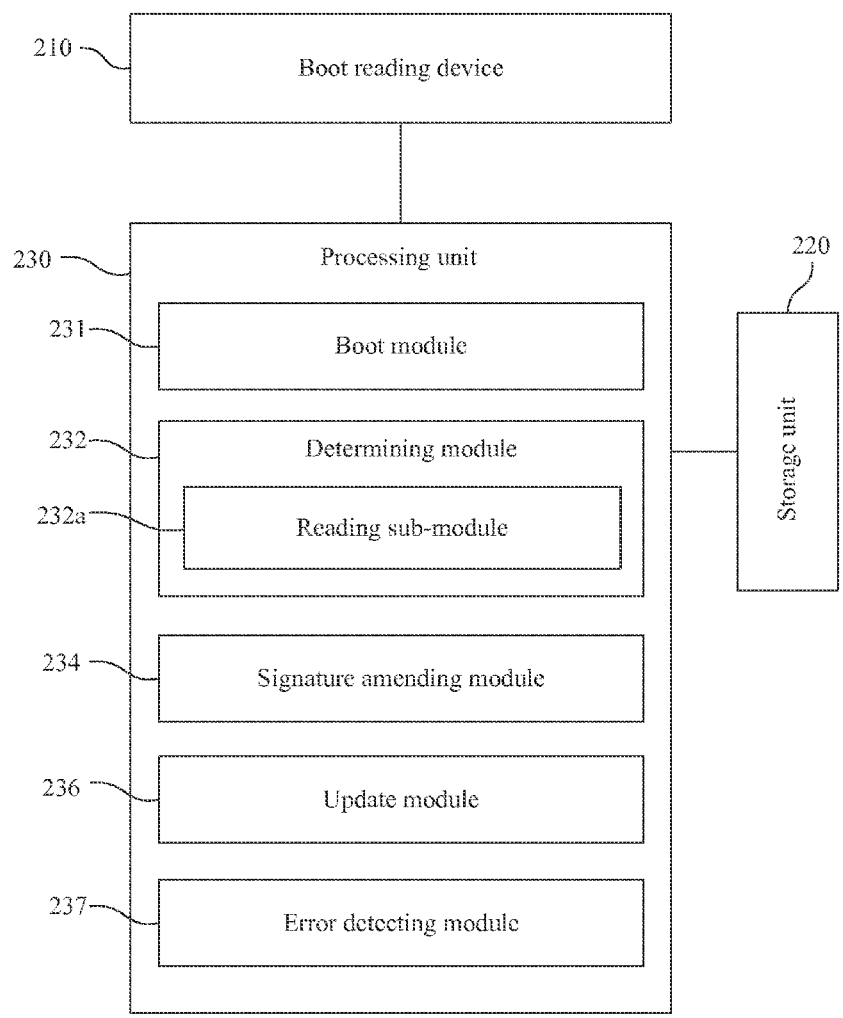
FIG. 3 illustrates a block diagram of an OS processing system according to another embodiment of this invention.

Referring to FIG. 3, a block diagram will be described that illustrates an OS processing system according to another embodiment of this invention. It is to be understood that aspects of this embodiment similar to those described above may not be repeated.

The OS processing system may update the OS of the host computer. Hence, the processing unit 230 may further include an update module 236. If it is determined that the present version signature of the host computer does not match the preset version signature according to the data stored in the specified address, the update module 236 may further read the image version signature from the boot reading device 210. Subsequently, the update module 236 may determine if the present OS of the host computer needs to be updated according to the image version signature. If it is determined that the present OS of the host computer needs to be updated, the update module 236 updates the present OS of the host computer according to the OS image. The signature amending module 234 amends the data stored in the specified address of the MBR according to the image version signature of the installed OS for corresponding to the present version signature of the present OS of the host computer. Therefore, the OS of the host computer can be updated by storing or loading a boot loader and an OS image of the OS desired to be installed in the boot reading device 210. In some embodiments, if a remote server is set as the boot reading device 210, the OS of the host computer can be installed or updated by storing the boot loader and the OS image desired to installed on the remote server, which leads that users do not have to attend the place where the host computer installed in person.

In another embodiment of this invention, the present version signature is generated with an error-detecting method. The processing unit may further include an error detecting module 237. The error detecting module 237 determines if the data stored in the specified address corresponding to the present version signature of the host computer is correct utilizing the error-detecting method. The determination result can be taken as a factor to determine if the present version signature of the host computer matches the preset version signature. If it is determined incorrect, the processing unit installs the OS on the host computer according to the OS image, which is subsequently taken as the present OS of the host computer. In subsequence, the signature amending module 234 amends the data stored in the specified address of the MBR according to the image version signature of the installed OS. The host computer may be then reset to execute the newly installed OS. Therefore, if the data stored in the specified address of the MBR is incorrect, the OS of the host computer can be re-installed. In one scenario of the present invention, if the MBR is affected by a boot-type virus, which may damage the MBR of the host computer, the OS of the host computer can be re-installed with the present invention.

Furthermore, the determining module 232 may include a reading sub-module 232a. The reading sub-module 232a reads the data stored in the specified address of the MBR. In some embodiments, the specified address of the MBR is address 444 or 445 of the MBR of the storage unit 220, which would not be damaged for storing the data in address 444 or 445, and would not be overwritten by other information in address 444 or 445. In another embodiment of this invention, the data stored in the specified address represents a storage location of the storage unit 220 for storing the present version signature. Hence, the reading sub-module 232a reads data stored in the storage location of the storage unit 220, which is then taken as the present version signature and provided to the determining module 232. Therefore, storage locations other than the MBR (for example, specified files, specified location at the OS of the host computer or specified blocks of the storage unit 220) can be utilized, which can provide a large storage space for storing the present version signature.

In some embodiments, the processing unit 230 may further include a comparing module. If it is determined that the present version signature does not match the preset version signature, the comparing module may further determines if the data stored in the specified address is less than the preset version signature. If it is determined that the data stored in the specified address is less than the preset version signature, the processing unit 230 installs the OS on the host computer according to the OS image. Hence, the installed OS is then taken as the present OS of the host computer. The signature amending module 234 amends the data stored in the specified address of the MBR according to the image version signature of the installed OS for corresponding to the present version signature of the present OS of the host computer.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An operating system (OS) processing method for a host computer, wherein the host computer comprises a master boot record (MBR), the OS processing method comprises:
   (a) when the host computer is booting, reading a boot loader from a boot reading device according to a boot priority order of the host computer, wherein the boot loader comprises a preset version signature;
   (b) executing a signature detecting program comprised in the boot loader to detect data stored in a specified address of the MBR of the host computer, wherein the data stored in the specified address corresponds to a present version signature of a present OS of the host computer;
(c) when it is determined that the present version signature of the host computer does not match the preset version signature according to the data stored in the specified address, reading an OS image from the boot reading device of the host computer, installing an OS on the host computer according to the OS image, and taking the installed OS as the present OS of the host computer; and
(d) amending the data stored in the specified address of the MBR according to an image version signature of the installed OS for corresponding to the present version signature of the present OS of the host computer.

2. The OS processing method of claim 1, wherein the operation (c) comprises:
if it is determined that the present version signature of the host computer does not match the preset version signature according to the data stored in the specified address, further reading the image version signature to determine if the present OS of the host computer needs to be updated; and
if it is determined that the present OS is needed to be updated, updating the present OS of the host computer according to the OS image, and amending the data stored in the specified address of the MBR according to the image version signature of the installed OS for corresponding to the present version signature of the present OS of the host computer.

3. The OS processing method of claim 1, wherein the operation (c) comprises:
if it is determined that the present version signature does not match the preset version signature according to the data stored in the specified address, further determining if the data stored in the specified address is less than the preset version signature; and
if it is determined that the data stored in the specified address is less than the preset version signature, installing the OS on the host computer according to the OS image, amending the data stored in the specified address of the MBR according to the image version signature of the installed OS for corresponding to the present version signature of the present OS of the host computer.

4. The OS processing method of claim 1, wherein the data stored in the specified address of the MBR of the host computer is the present version signature of the present OS of the host computer.

5. The OS processing method of claim 4, wherein the specified address of the MBR is address 444 or 445 of the MBR.

6. The OS processing method of claim 1, wherein:
the data stored in the specified address represents a storage location on the host computer for storing the present version signature, and
the operation (b) comprises reading data stored in the storage location on the host computer and taking the read data as the present version signature.

7. The OS processing method of claim 1, wherein the host computer is a physical host computer or a virtual host computer.

8. The OS processing method of claim 1, wherein the present version signature is generated with an error-detecting method, the operation (c) further comprises:
determining if the data stored in the specified address corresponding to the present version signature of the host computer is correct by the error-detecting method for determining if the present version signature of the host computer matches the preset version signature; and
if it is determined not correct, installing the OS on the host computer according to the OS image, and taking the installed OS as the present OS of the host computer.

9. An OS processing system disposed on a host computer, wherein the OS processing system comprised:
a storage unit comprising an MBR, wherein the storage unit stores a boot priority order of the host computer;
a boot reading device for reading a boot loader according to the boot priority order of the host computer when the host computer is booting, wherein the boot loader comprises a preset version signature; and
a processing unit communicated with the storage unit and the boot reading device, wherein the processing unit comprises:
a boot module for executing a signature detecting program comprised in the boot loader to detect data stored in a specified address of the MBR of the storage unit, wherein the data stored in the specified address corresponds to a present version signature of a present OS of the host computer;
a determining module for reading an OS image from the boot reading device when it is determined that the present version signature of the host computer does not match the preset version signature according to the data stored in the specified address, and installing an OS on the host computer according to the OS image, and taking the installed OS as the present OS of the host computer; and
a signature amending module for amending the data stored in the specified address of the MBR according to an image version signature of the installed OS for corresponding to the present version signature of the present OS of the host computer.

10. The OS processing system of claim 9, wherein the processing unit further comprises:
an update module for further reading the image version signature to determine if the present OS of the host computer needs to be updated if it is determined that the present version signature of the host computer does not match the preset version signature according to the data stored in the specified address,
wherein if it is determined that the present OS of the host computer needs to be updated, the update module updates the present OS of the host computer according to the OS image, and amends the data stored in the specified address of the MBR according to the image version signature of the installed OS for corresponding to the present version signature of the present OS of the host computer.

11. The OS processing system of claim 9, wherein the processing unit further comprises:
a comparing module for further determining if the data stored in the specified address is less than the preset version signature if it is determined that the present version signature does not match the preset version signature according to the data stored in the specified address,
wherein if it is determined that the data stored in the specified address is less than the preset version signature, the processing unit installs the OS on the host computer according to the OS image, takes the installed OS as the present OS of the host computer, amends the data stored in the specified address of the MBR according to the image version signature of the installed OS for corresponding to the present version signature of the present OS of the host computer.

12. The OS processing system of claim 9, wherein the specified address of the MBR is address 444 or 445 of the MBR of the storage unit.

13. The OS processing system of claim 9, wherein the data stored in the specified address represents a storage location of the storage unit for storing the present version signature, the determining module comprises:

a reading sub-module for reading data stored in the storage location of the storage unit to be taken as the present version signature and provide to the determining module.

14. The OS processing system of claim 9, wherein the boot reading device is a flash memory, a floppy disk, a hard disk, an optical storage device, a flash disk, a magnetic storage device or a remote server which can be accessed through a network.

15. The OS processing system of claim 9, wherein the present version signature is generated with an error-detecting method, the processing unit further comprises:

an error detecting module for determining if the data stored in the specified address corresponding to the present version signature of the host computer is correct utilizing the error-detecting method to be a factor to determine if the present version signature of the host computer matches the preset version signature, wherein if it is determined not correct, the processing unit installs the OS on the host computer according to the OS image, and takes the installed OS as the present OS of the host computer.

16. A non-transitory computer readable storage medium with a computer program to execute an OS processing method for a host computer, wherein the host computer comprises an MBR, the OS processing method comprises:

(a) when the host computer is booting, reading a boot loader from a boot reading device according to a boot priority order of the host computer, wherein the boot loader comprises a preset version signature;

(b) executing a signature detecting program comprised in the boot loader to detect data stored in a specified address of the MBR of the host computer, wherein the data stored in the specified address corresponds to a present version signature of a present OS of the host computer;

(c) when it is determined that the present version signature of the host computer does not match the preset version signature according to the data stored in the specified address, reading an OS image from the boot reading device of the host computer, installing an OS on the host computer according to the OS image, and taking the installed OS as the present OS of the host computer; and (d) amending the data stored in the specified address of the MBR according to an image version signature of the installed OS for corresponding to the present version signature of the present OS of the host computer.

* * * * *